US006245181B1

(12) United States Patent
Bright

(10) Patent No.: US 6,245,181 B1
(45) Date of Patent: Jun. 12, 2001

(54) APPLYING STRETCHED LABELS TO CYLINDRICAL CONTAINERS

(75) Inventor: Lyn E. Bright, Ceres, CA (US)

(73) Assignee: B & H Manufacturing Company Inc., Ceres, CA (US)

( * ) Notice: Subject to any disclaimer, the term of this patent is extended or adjusted under 35 U.S.C. 154(b) by 898 days.

(21) Appl. No.: 08/543,840

(22) Filed: Oct. 23, 1995

Related U.S. Application Data

(63) Continuation-in-part of application No. 08/495,982, filed on Jun. 28, 1995, now abandoned.

(51) Int. Cl.[7] ...................................................... B32B 31/04

(52) U.S. Cl. .......................... 156/215; 156/229; 156/291; 156/DIG. 9; 156/DIG. 11; 156/DIG. 13; 156/256

(58) Field of Search .............................. 156/86, 215, 229, 156/446, 448, 449, 567, 568, DIG. 9, DIG. 10, DIG. 11, DIG. 12, DIG. 13, DIG. 31, 291, 256

(56) References Cited

U.S. PATENT DOCUMENTS

| | | | |
|---|---|---|---|
| 3,235,433 | 2/1966 | Cvacho et al. | 156/229 |
| 4,216,044 * | 8/1980 | Herdzina et al. | 156/448 X |
| 4,416,714 | 11/1983 | Hoffmann | 156/86 |
| 4,923,557 * | 5/1990 | Dickey | 156/86 |

FOREIGN PATENT DOCUMENTS

| | | |
|---|---|---|
| WO 94/14611 | 7/1994 | (WO) . |

* cited by examiner

*Primary Examiner*—Curtis Mayes
(74) *Attorney, Agent, or Firm*—Lariviere, Grubman & Payne, LLP

(57) ABSTRACT

A method for applying to articles such as containers, segments of sheet material, such as labels, which are elastic. Each segment has a leading end and a tailing end which are not connected to one another to form a sleeve except by adhesive. Such segment is applied to articles in stretched condition such that it will shrink to conform to the surface of the article when, for example, the article shrinks.

15 Claims, 5 Drawing Sheets

FIG.−2

APPLYING STRETCHED LABELS TO CYLINDRICAL CONTAINERS

This application is a continuation-in-part of U.S. patent application Ser. No. 08/495,982 filed Jun. 28, 1995 and entitled Applying Stretch labels, now abandoned.

BACKGROUND OF THE INVENTION

As described in my copending U.S. application Ser. No. 08/495,982 referred to above now abandoned, it is known to apply elastic labels to containers in the form of sleeves which are stretched to fit over the container, e.g. over the cylindrical body of the container, and are then allowed to relax and provide a tight fit onto the cylindrical part of the container. If there are indented or what are commonly known as "contoured" parts of the container, such as the shoulder of a container above its cylindrical body, the label applied in this manner will shrink onto such indented or contoured portion or portions.

Herein below for convenience the term "label" or "labels" and the term "container" or "containers" will be used, but it is to be understood that other segments of sheet material may be applied for example for decorative purposes and that other articles than containers may have labels or other segments of sheet material applied to them.

Such sleeve application requires forming sleeves, then removing them from the sleeve forming mechanism and stretching them and applying them to the container. This is an expensive procedure.

Whether the label is applied only to the cylindrical body of a container or whether it is applied also to contoured portions of the container, elastic, stretched label material is advantageous, for example, in the case of containers filled with carbonated beverages. If a container contains a carbonated beverage and it is opened and part of the contents are consumed and then the container is stoppered for further use at a later time, the internal pressure of the carbonation is diminished or ceases altogether. If the label is, for example, a paper label or an unstretched non-elastic plastic label the diameter of the container will diminish and the label will be loose. It is therefore an advantage to have a label which is elastic and which as originally applied to the container forms a tight fit with the container but which when the container diminishes in diameter will nevertheless shrink so as to fit the container tightly. Even if the container is rigid and does not expand or contract due to changes in internal pressure it is advantageous to use an elastic label which is applied in stretched condition to accommodate irregularities on the surface of the container.

OBJECTS OF THE INVENTION

It is an object of the present invention to apply stretchable labels in stretched condition to containers without the need to preform the labels into sleeves.

The above and other objects of the invention will be apparent from the ensuing description and the appended claims.

SUMMARY OF THE INVENTION

In accordance with the invention stretched elastic label material, e.g., stretchable polyethylene is supplied continuously to a cutting instrumentality such as that shown in U.S. Pat. No. 4,181,555 and each label, after it passes through the cutter and before it is cut into individual labels, is supplied to a rotating vacuum drum and its leading end is placed on the rotating vacuum drum, which grips the label by vacuum. Alternatively, but less desirably, precut labels are fed from a stack of the same to a vacuum drum, as for example in U.S. Pat. No. 4,978,416, likewise being gripped by the vacuum of the vacuum drum. In either case the peripheral speed of the drum exceeds the linear speed of the label. In the absence of a sufficiently high vacuum this would lead to slippage of the label on the drum. However, by using a sufficiently high vacuum this is avoided. Hence the label is held firmly on the drum by vacuum and by reason of the fact that the peripheral speed of the drum is greater than that of the label feed through the cutting instrumentality, the label is stretched. Alternatively the leading end of the label may be clamped onto the vacuum drum, e.g., as described in Eder U.S. Pat. No. 5,116,452. The combined use of a clamp and a vacuum strong enough to hold the label against slippage may also be employed.

The label thus held in stretched condition on the drum is then contacted, e.g., at the leading end and at the tailing end by a glue applicator which applies glue to the leading end and to the trailing end so that when the label is wrapped around the container it is adhered thereto. Also the use of a solvent applied to the label and absorbed by the label to form an adhesive in situ may be employed. Alternatively also heat sealing of the ends of the label together may be accomplished as for example in U.S. Pat. No. 5,137,596.

The problem of relaxation of the label from its stretched condition when it is released from the vacuum drum may be dealt with as follows:

The adhesive applied to the leading end of the label to adhere it to the container may be an adhesive which bonds very quickly and strongly to the label and to the container, such that it prevents or minimizes relaxation of the label as it leaves the vacuum drum and bonds to the container. Examples of such adhesives are provided below. Alternatively, or in conjunction with the use of such an adhesive, the adhesive may be applied as a series of dots spaced lengthwise along the label or around the periphery of a container. Thus the first dot or array of dots of adhesive near the leading end of the label will be followed by a dot or array of dots spaced a short distance from the first dot or array, etc. Therefore the label will be held firmly on the container as each label comes off of the vacuum drum and it is prevented from relaxing or the relaxation of the label is not significant.

Adhesive may be applied to the container rather than the label or it may be applied to both the container and the label. In U.S. Pat. No. 3,834,963 adhesive application to the container is shown. The adhesive application to the container may be (as in U.S. Pat. No. 3,834,963) applied to both the container and the label, and the pattern of adhesive applied to the container may vary. For example, a line of adhesive may be applied to the container for adhesion to the leading end of the label, or it may be applied both to the leading end and to the trailing ends of the label, or it may be applied to the entire circumference of the container as a succession of dots.

Hereinabove "dots" of adhesive have been referred to, but adhesive may be applied as bands or strips to the container and/or to the label.

The labeled container is then removed from the label applying equipment.

Instead of employing a greater peripheral speed of the vacuum drum to stretch the label, the container may be caused to spin at a peripheral speed which is greater tand that of the vacuum drum, thereby stretching the label. The peripheral speed of the container is the composite of the speed at which it is caused to spin, its diameter and the speed at which it travels after first making contact with the label. The difference in speed of the label while on the drum and this composite speed can be governed quite precisely by gears or by computer controlled motors as described below. To prevent the label from slipping on the container due to its greater peripheral speed, an adhesive which bonds strongly and quickly may be used. Alternatively (and/or in addition to such procedure), adhesive may be applied as a succession of dots so that the label is adhered to the container, not at one point but at several points.

The label may also be stretched by both procedures, that is by operating the vacuum drum at a peripheral speed greater than the label feed and by also causing the container to spin more at a composite speed greater than the peripheral speed of the vacuum drum.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Figure 1:
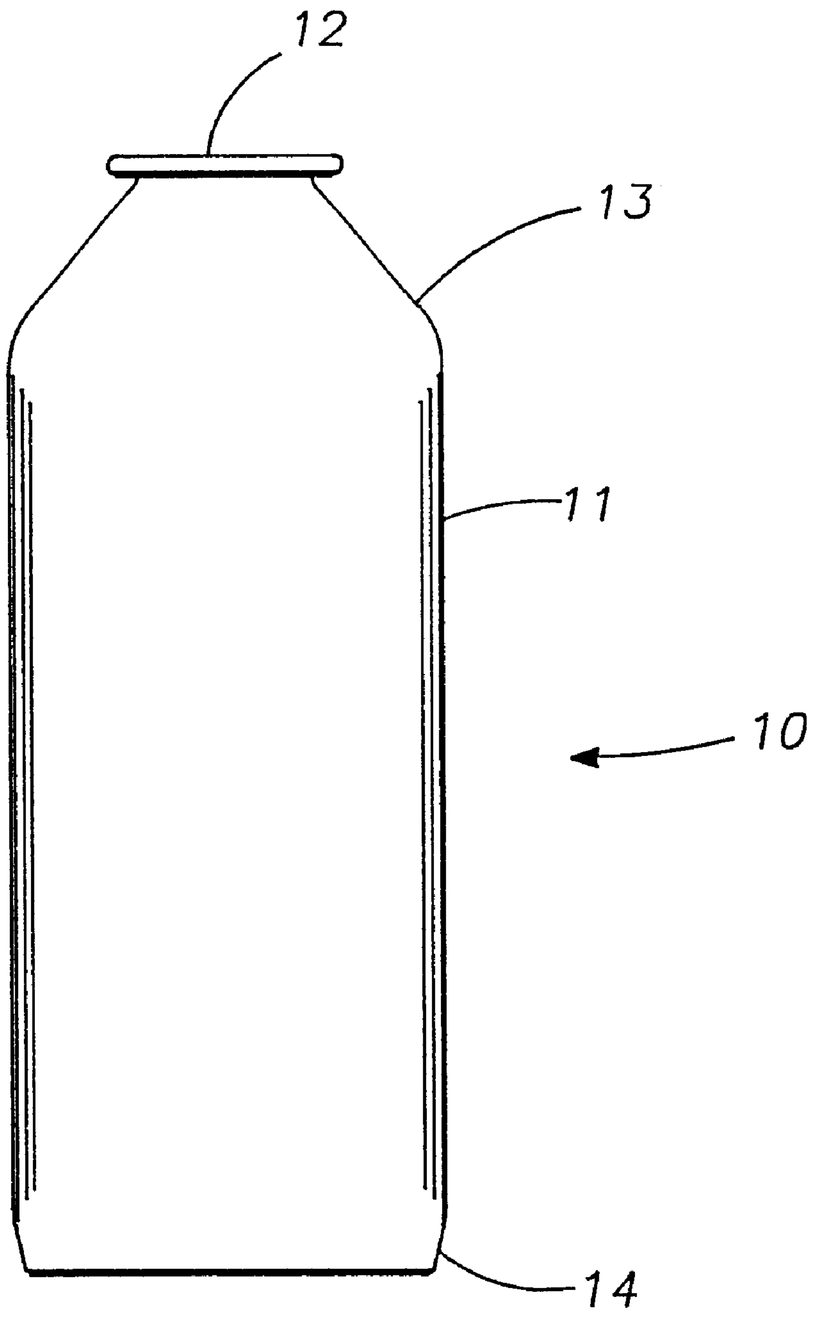
FIG. 1 is a view of a container which can be labeled by the method and with the apparatus of the present invention.

Referring now to FIG. 1, a container is shown at 10 which has a cylindrical body 11, at top 12 and a sloping neck or shoulder 13 and a curvature 14 at the bottom. This container is labeled as described below.

Figure 2:
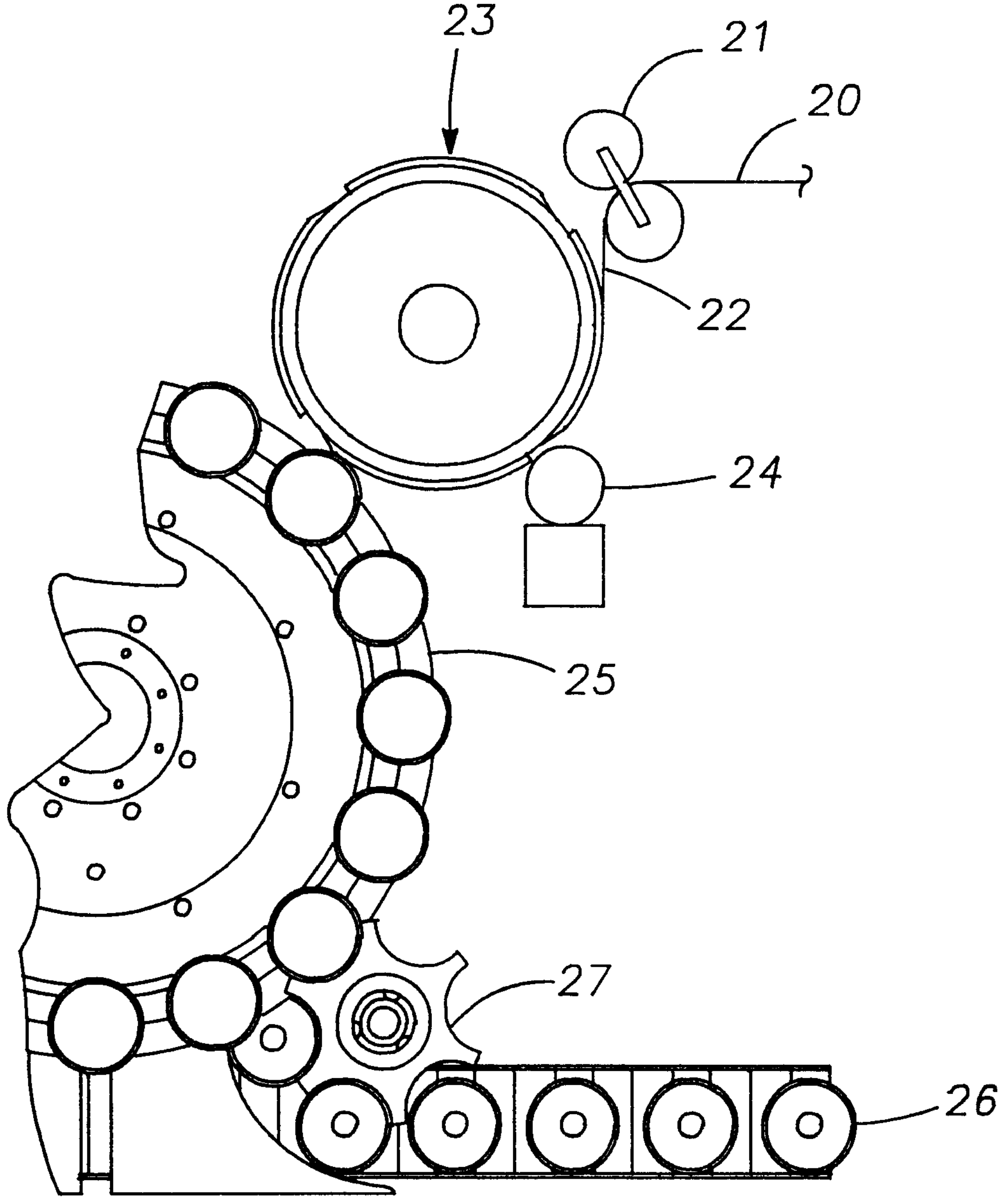
FIG. 2 is a top plan view of a label applying machine suited for use in the present invention.

Referring now to FIG. 2, which is taken from FIG. 1 of U.S. Pat. No. 4,108,709 but is simplified, continuous label stock 20 from a roll of such stock and a label feed (not shown) passes through a cutter 21 which severs the label stock into individual labels 22. Before a label is severed from the label stock, its leading end is delivered to a vacuum drum 23 and, as it is transported by the drum to a container, it has adhesive applied by a glue applicator 24 to its leading end or to its trailing end, or to both its leading and traling ends as described above, a glue pattern being applied as described above. The severed label with adhesive applied to it is delivered to a turret 25 which picks up containers 26 from an infeed star wheel 27. The turret picks up each container in its turn, spins it and transports it past the vacuum drum 23, where it contacts the leading end of a label on the vacuum drum. The vacuum is released at this point of contact so that the label is released and will adhere to and wrap around the container.

As described above, the label is elastic and it is stretched by reason of the fact that the vacuum drum has a peripheral speed exceeding that of the label stock as it is fed to the vacuum drum and the label is prevented from slipping by reason of the vacuum exerted by the vacuum drum 25 and/or by a clamping device as described above or by both such means.

Figure 3:
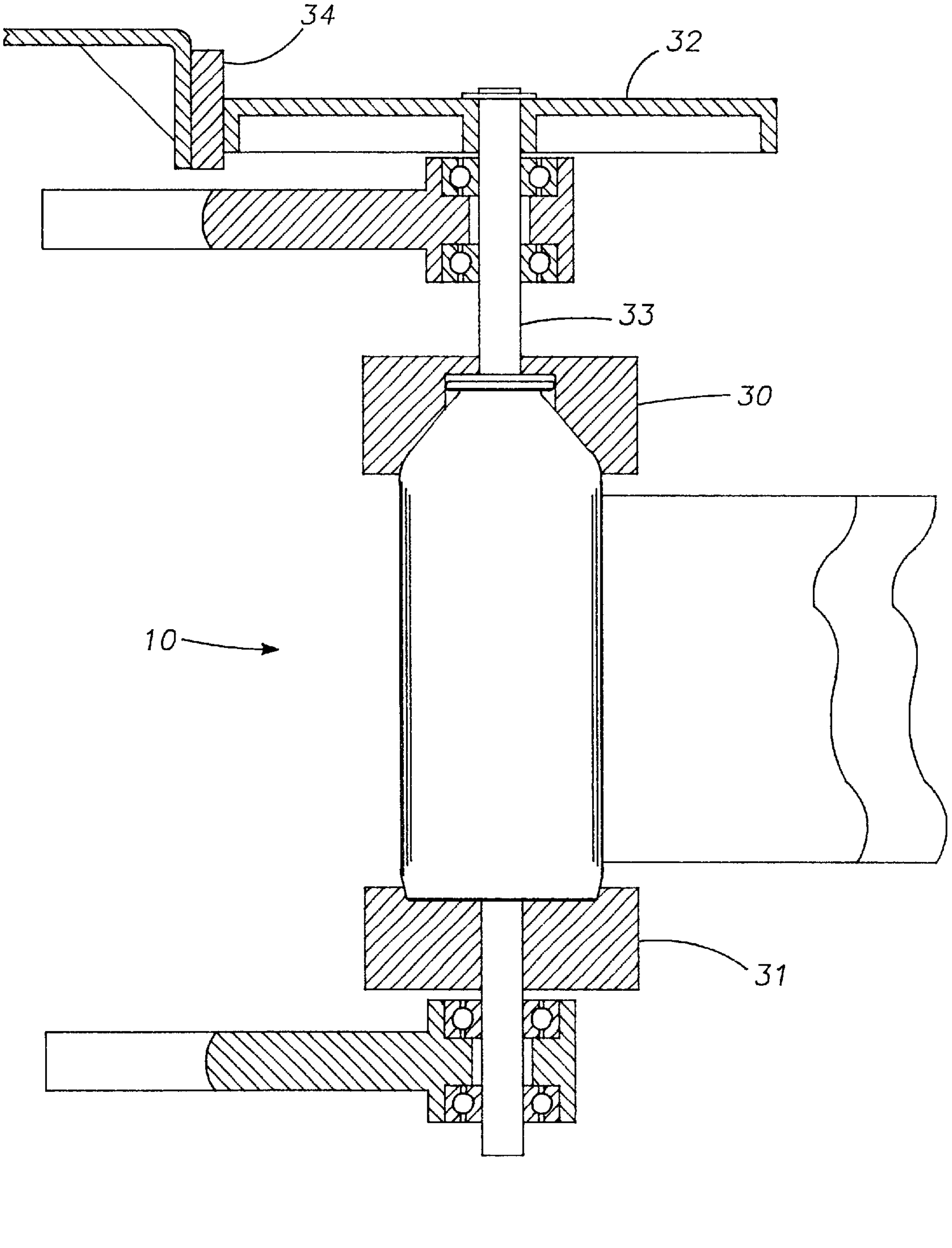
FIG. 3 is a section taken along line 3—3 of FIG. 2.

Referring now to FIG. 3, which is taken from FIG. 2 of U.S. Pat. No. 4,108,709 but is simplified and omits parts and employs different reference numerals, the turret has a number of pairs of chucks 30 and 31 which clamp a container between them. As the turret continues to rotate the upper chuck 30 is caused to spin by a wheel 32 and shaft 33, the wheel 32 being spun by contact with a pad 34 which has a circular arc centered on the axis of the turret. The leading end of the label contacts the container which is spinning and which is also moving about the axis of the turret and vacuum is released so that the label is free to adhere to and move with the container.

To prevent the stretched label from relaxing when it is released by the vacuum drum, adhesive on the label and/or the container acts to hold the label on the container in stretched condition. The label is therefore applied to the container in stretched condition.

Figure 4:
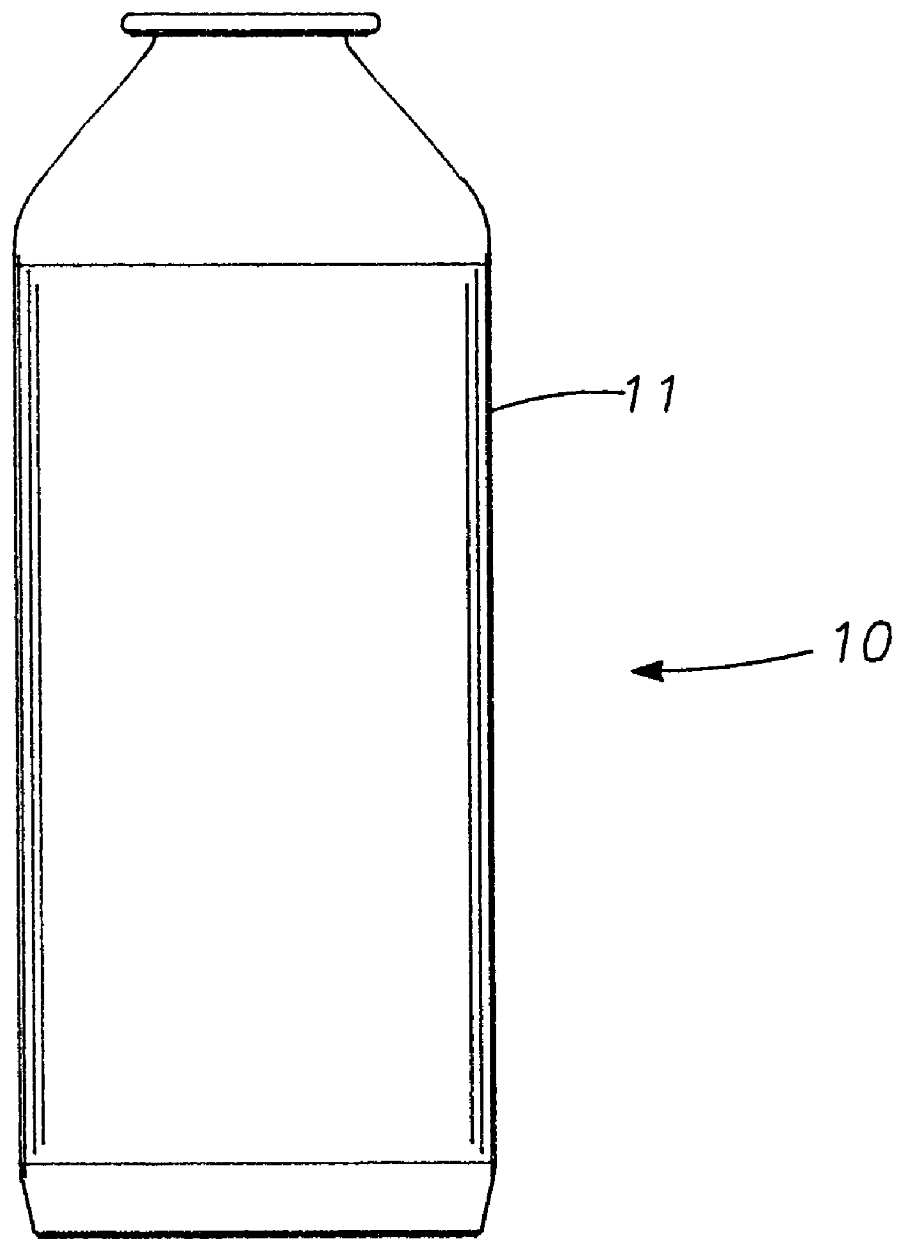
FIG. 4 is a view of the container of FIG. 1 with the label applied thereto.

Referring now to FIG. 4, a labeled container is there shown. The label is applied tightly to the cylindrical body 11 of the container and is in stretched condition such that if the diameter of the container shrinks because of loss of carbonation, or by cooling or for any other reason the label will relax to accommodate the diminished diameter yet will remain tight on the container. Also, if the container is deformed as by means of manual pressure or by impact with other containers or objects or for any other reason the label material overlying such deformation will accommodate itself to the deformation. This applies both to areas of diminished diameter and also to areas which extend above the general surface of the container, for example embossing decoration.

Figure 5:
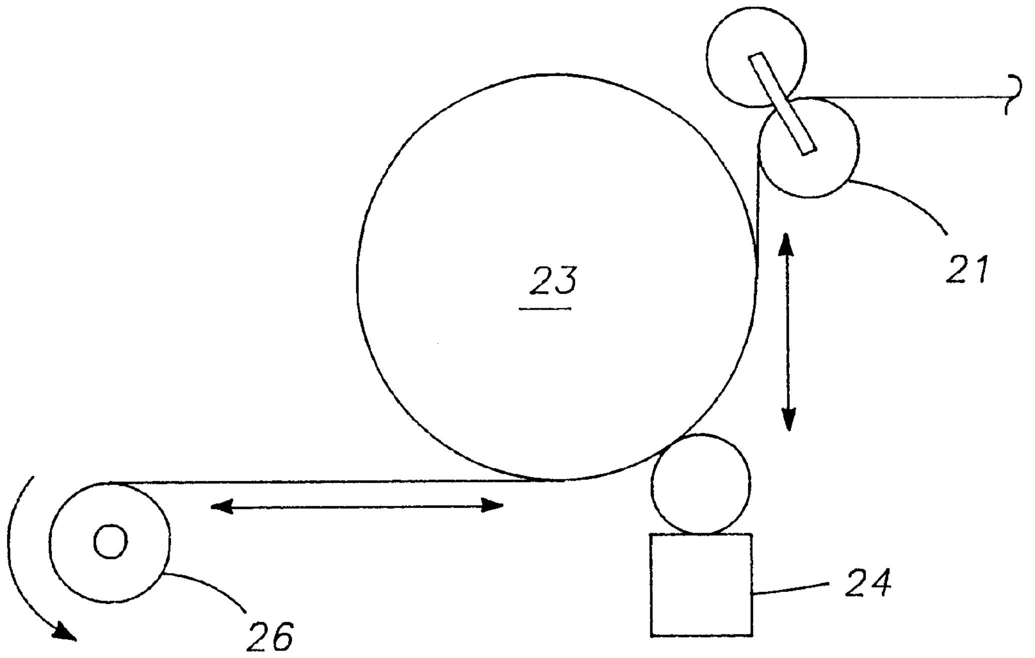
FIG. 5 is a diagrammatic illustration of the method of the invention.

Referring now to FIG. 5, the label cutter 21, the vacuum drum 23, the glue applicator 24, and a container 26 are shown diagrammatically. The double headed arrows indicate the stretching of the label between the label feed and the vacuum drum and between the vacuum drum and the container.

Figure 6:
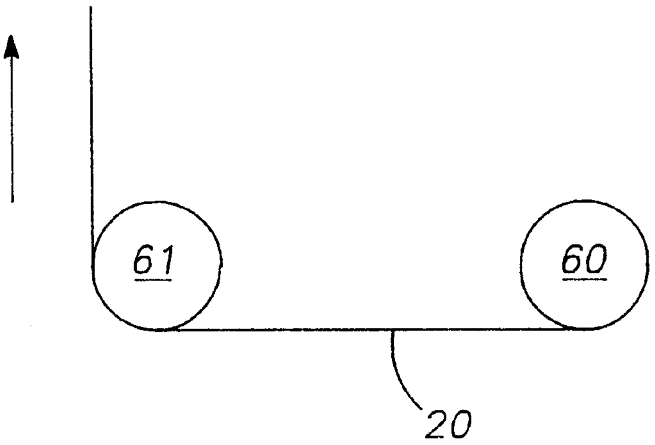
FIG. 6 shows another way of stretching the label.

Referring now to FIG. 6, a roll 60 of label stock is shown, such roll being driven by a motor (not shown) to feed label material 20 in the direction indicated by the arrow. The label material is partially wrapped around a roller 61 which rotates at a peripheral speed greater than the peripheral speed of the roll 60. Vacuum may be applied to the surface of the roller 61 to prevent slippage of the label material. As a result, the label material is stretched between the roll 60 and the roll 61. The roll 60 may be driven to impart to the label material leaving it a constant peripheral speed as the roll diminishes in diameter.

The moving parts of the machine described above, such as the label feed, the cutter, the vacuum drum, the glue applicator, the turret, chucks and the roll 60 in FIG. 6 may be operated by means of individual motors which are computer controlled, as for example in U.S. Pat. No. 5,380,381 or in Bright and Otruba U.S. patent application Ser. No. 08/122,857 filed Sep. 16, 1993, now U.S. Pat. No. 5,478,422.

Among other advantages of applying elastic, stretched labels are the following: Elastic labels reduce breakage and fragmentation of containers. If a plastic container is filled with a carbonated beverage and is then sealed it will expand due to the pressure of the carbonation and when it is emptied it will contract. In such a case the elastic label will expand and contract accordingly. An elastic label may be warmed before it is applied, thus allowing it to be stretched more easily.

The drawings and verbal description above have been with respect to articles, each having a body portion of uniform diameter, usually cylindrical. The invention is also applicable to articles such as, for example, a cylindrical bottle or other container having on its cylindrical surface projecting portions to serve as decoration and which stand out from the cylindrical surface. The elastic segments, for example, transparent stretchable label material, may be applied over such projecting portions and onto the cylindrical body of the bottle. For example, the article may have a decorative protection. By the method of the invention, a transparent elastic label may be wrapped around the container in stretched position so as to overlie but not conceal the projecting decoration. The applied label will shrink onto the surrounding cylindrical surface. Moreover, the container or other article which is wrapped with a stretched segment of elastic material need not be cylindrical; e.g. it may be elliptical or polygoual, e.g. rectangular, in cross section.

It is also to be understood that the elastic label material may extend over contoured portions of a container such as the shoulder 13 and/or the curved bottom portion 14 shown in FIG. 1.

It will therefore be apparent that a new and useful machine and a new and useful method have been provided for applying segments of sheet material, e.g. labels, to container and other articles.

What is claimed is:

1. A method of applying an elastic segment of sheet material having a leading end and a trailing end unattached to the leading end to the surface of an article, said method comprising:

(1) stretching the segment to elastically deform the segment and increase the distance between the leading and trailing ends, (2) applying said segment while so stretched to the article by adhering the leading end of the stretched segment to the article with a fast acting adhesive which substantially adheres the leading end of the stretched segment to the article while the stretched segment is in an elastically deformed condition, wrapping the stretched segment around said article and securing the trailing end of the stretched segment to said leading end or to the article, whereby said segment as applied to the article is in the elastically deformed condition.

2. The method of claim 1 wherein the article is a container and the segment is a label.

3. The method of claim 1 or claim 2 in which the segment is severed from a continuously moving length of sheet material which is deposited on the cylindrical surface of a continuously rotating vacuum drum and is rotated to a segment applying station at which each segment is released from the vacuum drum to a spinning article which wraps the segment about itself, the segment being in such stretched condition while being so applied to the spinning article.

4. The improvement of claim 3 in which each segment is stretched by at least one of the following means;

(1) rotating the vacuum drum at a peripheral speed greater than the speed of the sheet material;

(2) moving each article as a segment is applied to it at a surface speed greater than the peripheral speed of the vacuum drum.

5. The improvement of claim 4 wherein the article is a container and the segment is a label.

6. The method of claim 1 or claim 2 wherein the article is a container for a carbonated beverage.

7. The method of claim 1 in which said step of applying said segment includes applying an adhesive only to the leading end and the trailing end of said segment, said adhesive being a fast acting adhesive such that said adhesive forms a bond before the stretched segment relaxes.

8. The method of claim 1 in which said step of applying said segment includes applying adhesive to the underside of the stretched segment in a plurality of locations.

9. A method of applying a segment of a sheet of material to the exterior surface of an article, said segment having a leading edge and a trailing edge, said method comprising the steps of:

releasably mounting a segment of said elastic material to a carrier body, stretching the segment to elastically deform said segment and increase the length between said leading edge and said trailing edge, applying an adhesive to one of said article and said leading edge of the elastically deformed segment and mounting said leading edge to said article with said adhesive, said adhesive being a fast acting adhesive such that said leading edge is substantially secured to said article before said segment is released from said carrier body, producing relative movement of said carrier body and said article to wrap the elastically deformed segment around said article, successive portions of the elastically deformed segment being released from said carrier body as the elastically deformed segment is wrapped around said article, and applying an adhesive to one of said article and said trailing edge of the elastically deformed segment and mounting said trailing edge to one of said article and said segment with said adhesive, said adhesive being a fast acting adhesive such that said trailing edge is secured to said article before said trailing edge is released from said carrier body.

10. The method of claim 9 in which said releasably mounting step includes applying said segment to a vacuum drum.

11. The method of claim 9 in which said stretching step includes moving each article as the elastically stretch segment is applied to said article at a surface speed greater than the speed of said carrier body.

12. The method of claim 9 in which said stretching step includes retaining said segment in the elastically deformed condition by holding the elastically deformed segment against said carrier body by at least one of a vacuum and a clamping mechanism.

13. The method of claim 9 in which said step of applying said segment includes applying adhesive to one of said article and segment in a plurality of circumferentially spaced locations.

14. The method of claim 9 wherein the article is a container and the segment is a label.

15. A method of applying a segment of a sheet of material to the exterior surface of an article, said segment having a leading edge and a trailing edge, said method comprising the steps of:

releasably mounting a segment of said elastic material to a carrier body, stretching the segment to elastically deform said segment and increase the length between said leading edge and said trailing edge, applying an adhesive to one of said article and said leading edge of the elastically deformed segment and mounting said leading edge to said article with said adhesive, said adhesive substantially securing said leading edge to said article before said segment is released from said carrier body, producing relative movement of said carrier body and said article to wrap the elastically deformed segment around said article, successive portions of the elastically deformed segment being released from said carrier body as the elastically deformed segment is wrapped around said article, applying an adhesive to one of said article and said trailing edge of the elastically deformed segment and mounting said trailing edge to one of said article and said segment with said adhesive, said adhesive substantially securing said trailing edge to said article before said trailing edge is released from said carrier body, said stretching step including supplying said segment to the exterior surface of said carrier body at a first speed and rotating said carrier body at a velocity such that the exterior surface moves at a second speed greater than said first speed to elastically deform said segment.

* * * * *

UNITED STATES PATENT AND TRADEMARK OFFICE

CERTIFICATE OF CORRECTION

PATENT NO. : 6,245,181 B1
DATED : June 12, 2001
INVENTOR(S) : Lyn E. Bright

It is certified that error appears in the above-identified patent and that said Letters Patent is hereby corrected as shown below:

Column 2,
Line 66, after the word "greater" delete [tand] and replace with -- than --.

Column 3,
Line 51, after the word "and" delete [traling] and replace with -- trailing --.

Column 5,
Line 9, after the word "decorative" delete [protection] and replace with -- projection --.

Signed and Sealed this

Twenty-fifth Day of December, 2001

*Attest:*

JAMES E. ROGAN

*Attesting Officer*

*Director of the United States Patent and Trademark Office*